May 23, 1972   M. J. SCHAFFNER   3,664,633
REMOTE CONTROLLED OIL AND LIQUID DRAIN VALVE
Filed Oct. 2, 1970   2 Sheets-Sheet 1

INVENTOR
MYER J. SCHAFFNER
BY
Richard N. Law
ATTORNEY

May 23, 1972    M. J. SCHAFFNER    3,664,633
REMOTE CONTROLLED OIL AND LIQUID DRAIN VALVE
Filed Oct. 2, 1970    2 Sheets-Sheet 2

INVENTOR
MYER J. SCHAFFNER
BY
Richard Ho Lau
ATTORNEY

United States Patent Office 3,664,633
Patented May 23, 1972

3,664,633
REMOTE CONTROLLED OIL AND LIQUID
DRAIN VALVE
Myer J. Schaffner, Westminster, Colo., assignor to
E-Z Serv, Inc., Arvada, Colo.
Continuation-in-part of application Ser. No. 7,058,
Jan. 30, 1970. This application Oct. 2, 1970, Ser.
No. 77,623
Int. Cl. F16k 5/00, 31/64
U.S. Cl. 251—294                               2 Claims

ABSTRACT OF THE DISCLOSURE

Oil is readily drained from an automotive vehicle engine crank case or oil pan by a remotely controlled especially adapted valve arranged to maintain closure tension on the valve in closed position.

---

This application is a continuation-in-part of application Ser. No. 7,058, filed Jan. 30, 1970, and assigned to the assignee of the present application.

When routine automobile maintenance operations are easily performed, automobile owners and operators are quite willing to personally perform the operations. Evidence of this do-it-yourself propensity is the popularity of self-service gas pump, self-operated car washes, and the fact that many people personally add the necessary oil, hydraulic fluid, brake fluid and the like to maintain desired levels in the reservoirs for such liquids. Although many persons personally change the oil in their automobile's crank cases, such maintenance has not achieved the popularity of the other do-it-yourself items, because of the inconveniences involved.

Typically, changing oil in an automobile engine involves getting under the vehicle, having the correct wrench, providing a collection receptacle for the drain oil, etc. Modern automobiles have a very low profile with such small ground clearance that there is insufficient working room under a ground standing automobile for an adult to have access to the engine oil pan drain plug. However, working room alone is not the solution to the problem. If one side of the front end of the automobile is raised, by jacking or by pulling a wheel up onto a curb, the engine and oil pan will be tilted; metal chips, shavings, and other debris in the oil pan will settle at the lowest point in the pan, and such a point may be distant from the drain plug. For a satisfactory oil change, the automobile must be maintained level. This generally requires the use of a full car hoist in a service station, with the result that the oil change is conducted at prices demanded by the service station, rather than with the considerably less expensive oil from discount sources—usually the same brand of oil. The cost differential may be several dollars in oil alone.

One advantage of frequent oil changes, at mileages far less than suggested by the automobile manufacturer is the savings in engine wear and the need for fewer oil filter changes. For instance, some manufactures suggest the oil and filter change every 3,000 miles or three months, which ever comes first. By changing oil every 1,200 to 1,500 miles, the oil does not breakdown between the changes, and the filter need not be changed every oil change. When the automobile owner personally changes his automobile's oil, replacing it with discount oil, the cost may be as little as one-third or one-fourth the cost of the oil change at a service station.

It is, therefore, included among the objects and advantages of the present invention, to provide an inexpensively fabricated and easily operated means for opening and closing an oil drain valve for automotive vehicles.

Another object of the invention is to provide a remote means for controlling an oil drain valve such as an oil pan drain of an automobile engine.

An additional object of the invention is to provide a remote controlled positive locking oil drain valve for an automobile engine.

A further object of the invention is to provide a remotely controlled automobile engine oil drain valve which provides a vertical discharge stream of oil from the oil pan of the automobile engine.

These and other objects and advantages of the invention may be readily ascertained by reference to the following description and appended illustrations, in which.

In general, the device of the invention provides an adapter block with a right angle passage therethrough, replacing the conventional oil pan solid drain plug. A connector fitting having a drain line and a threaded valve is threaded into the adapter block. The drain outlet may be conveniently positioned to drain the oil vertically downwardly. The screw threaded valve, in the closed position, retains the oil in the engine crank case and, in the open position, allows oil to flow from the oil sump through the adapter block and out the vertical outlet. The position of the threaded valve is remotely controlled via an encased cable having a rotatable handle at the distant end. Means are provided for maintaining a positive bias pressure on the valve in the closed position to prevent accidental opening of the valve.

Figure 1:
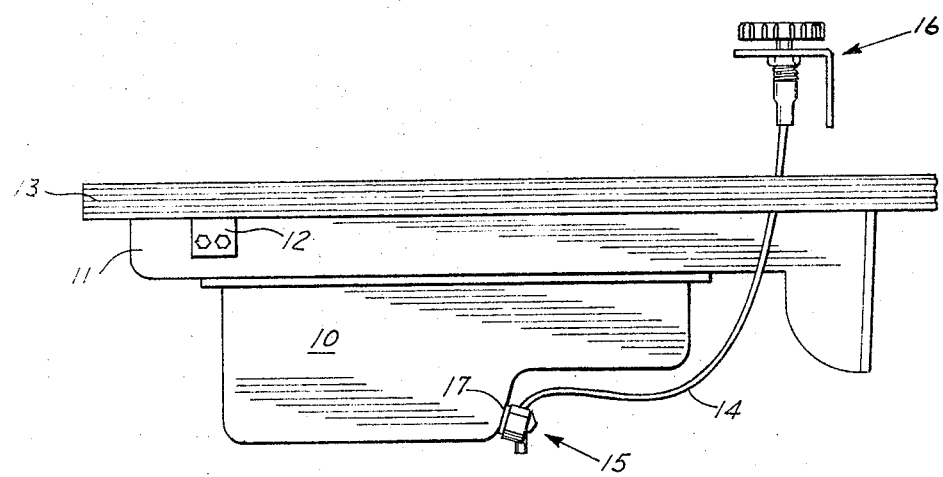
FIG. 1 is a schematic side elevational view of the device according to the invention attached to an automobile's oil pan.

A typical arrangement of components is shown in FIG. 1, wherein an engine 11 is mounted on frame member 13. Usually the lower portion or oil pan 10 of the engine 11 extends somewhat below the automobile's frame. The usual oil pan has an outlet 17 and removable drain plug at or near the pan's lowest point and positioned so as to be out of the way of road obstructions. FIG. 1, the usual drain plug has been replaced by an adapter-valve assembly, denoted in general by numeral 15. Remote control cable 14 extends from the adapter and valve assembly to a handle assembly, denoted in general by numeral 16, which may be mounted at some accessible point, for example, in forward portion of the automobile's engine compartment.

Figure 4:
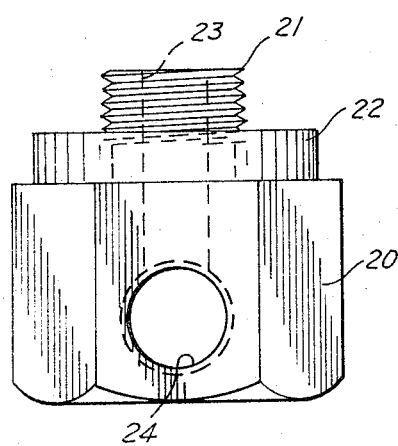
FIG. 4 is a detail of a locking handle for the device.
Figure 2:
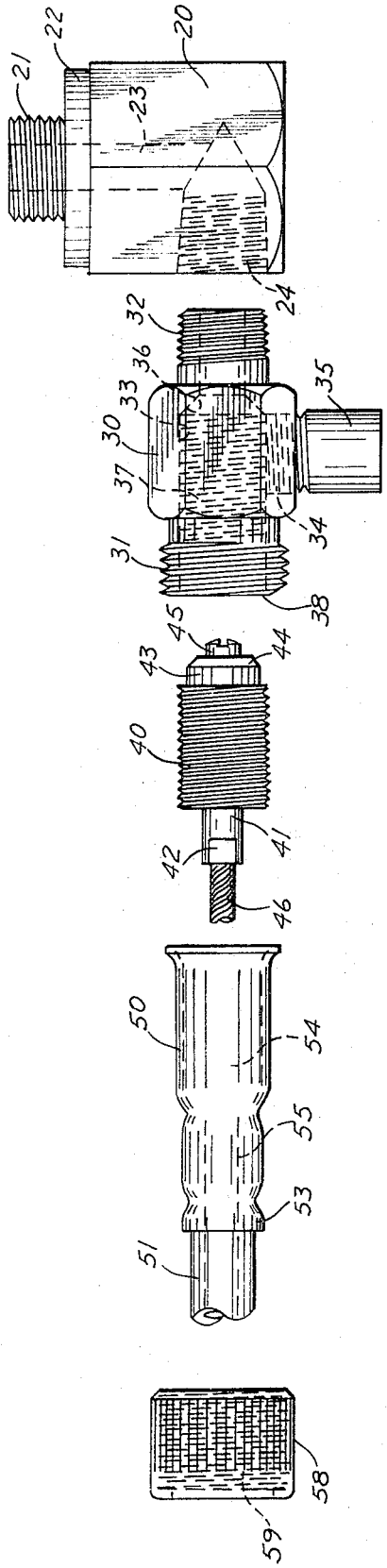
FIG. 2 is an exploded detail of the device according to the invention.

The adapter block 20, detailed in FIGS. 2 and 4, is of hexagonal cross-section, has an integral depending threaded portion 21. This threaded portion has a passage 23 extending therethrough communicating with passage 24 (best seen in FIG. 4) formed in body 20 perpendicular to passage 23. Concentrically extending around the threaded portion 21 is placed thick gasket washer 22 for abutting against body 20. Gasket 22 should be thick, non-foraminous, and slightly deformable; impregnated high density cork or neoprene is suggested. Extending portion 21 is threaded into the engine oil pan drain opening after the conventional oil pan drain plug is removed, and the hexagonal shape of body 20 allows the adapter plug to be easily tightened into and snugged against the oil pan with an ordinary wrench. The dimension of the threaded extending portion is, of course, determined by the dimensions of the threaded oil drain opening. Thus a relatively few different sizes are necessary to be adaptable to the majority of vehicles on the road. The remainder of the device need not be changed.

The compressible gasket will effect a non-leaking seal and permit the plug 20 to be rotated with the side opening in correct position. Since the thread wear may be different, oil drain opening positioned differently, the gasket lends universality to the unit.

Valve block 30, also of hexagonal cross-section, has opposed longitudinally axially extending threaded ends 31 and 32, and a passageway 33 therethrough. The passageway is threaded at the end 31 and a 45° valve seat is formed adjacent the end 32. Communicating with channel 33 is a normal threaded passage 34 into which outlet nipple 35 may be threaded. Valve passage 33 has a diameter portion 31 which is larger than the diameter of the passage in end 32 with tapered portion 36 forming the valve seat.

Valve 40, threadably engageable into valve passage 33, includes a cylindrcal threaded body of uniform diameter, valve disc 43 and valve stem 41. Suitable material for the valve body is brass or the like. Valve disc 43 preferably comprises a Teflon washer with tapered leading face 44 secured to valve 40 by set screw 45. The tapered portion 44 of the valve disc matches tapered portion 36 in the valve passage. Into square bore 42 in the rear of valve stem 41 is secured cable 46, described later in detail, by a cement such as an epoxy.

Trumpet connector 50, swedged to cable housing 51 at one end, has enlarged opposed end 52 which abuts smoothly and seals against end 38 of the extending end 31 of valve block 30. Connector 50 may be connected to cable housing 51 by clamping, cement, etc. Connector 50 has passage 54 formed therethrough for a cable and cable housing passage. Cap 58 has a threaded passage 59 formed therethrough for fitting over the trumpet 50, and threading onto the end 31 of the valve block.

Figure 3:
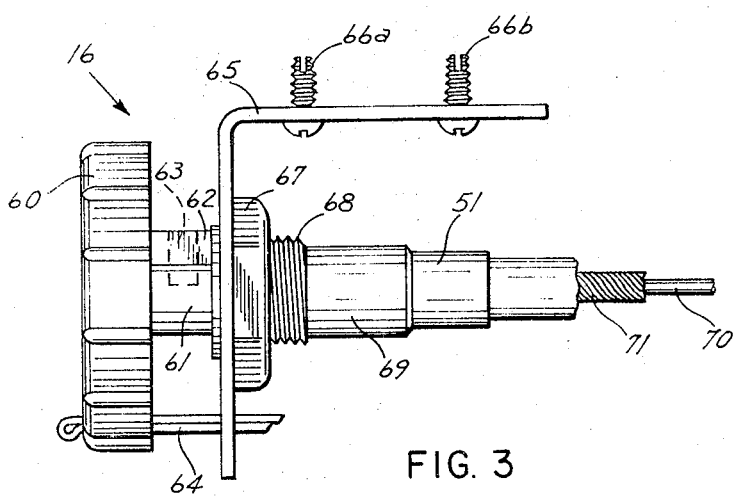
FIG. 3 is a detail of an oil pan adapter block.
Figure 5:
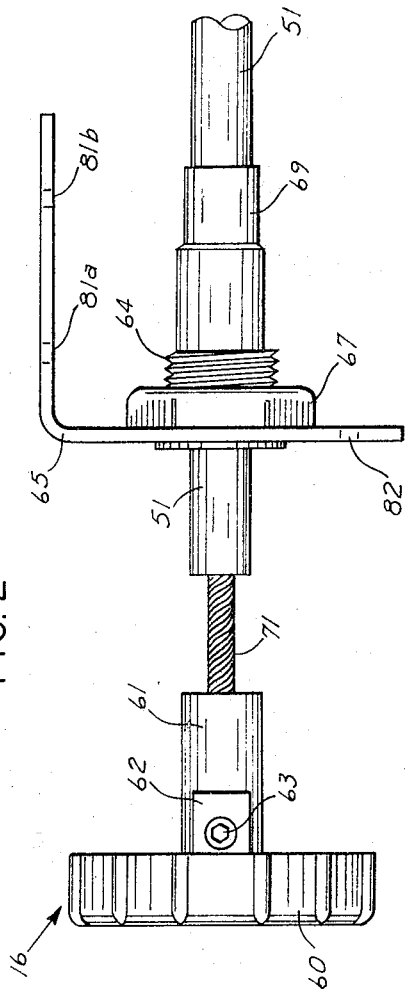
FIG. 5 is a further detail of the handle mechanism according to the invention.

The opposite end of cable carrying housing 51 has a control handle 60 and handle mounting apparatus, FIG. 3. The cable end is squared, inserted into a square hole in the handle stem 61, and secured therein by a set screw 63. The mounting apparatus comprises an "L" bracket 65, mounted on a guide 69 and secured thereon by nut 67. The cable housing 51 slides through guide 69 so that the bracket may be selectively positioned along the length of the cable housing, as can be seen in FIG. 5, for ease of mounting. Sheet metal screws such as 66a and 66b, FIG. 3, may be used to mount the bracket apparatus to a convenient portion of the vehicle body. The control cable includes an inner cable portion 70 covered with a tightly wound spring wire portion 71 wound therearound. The cable is freely rotatable within cable housing 51. While the intermediate portions of the cable are of circular cross-section, the ends may be formed with a square cross-section so as to fit into square holes forming a positive rotatable connection. Pin 64, FIG. 3, may be inserted through one or more holes formed in handle 60 into a hole in bracket 65 to hold the valve in a locked position.

The cable is provided with an oil and moisture resistant covering or housing 51, and it provides with the trumpet connector at the lower end to provide an enclosed unit at the end most subjected to water, mud, grease, oil and the like. The cable is completely enclosed, preferably formed of a tough coating over a metal tube, or a reinforced coating. Neoprene or other synthetic coating has been found satisfactory for such purposes. By forming the valve disc of machined Teflon, the valve is impervious to oil and moisture, and it is soft enough to form a leaf proof closure. Also, the outlet tube is illustrated as a short tube, but this may be made flexible and any desired length.

Installation of the device of the invention is begun by removing the conventional oil pan drain plug and replacing it with adapter plug 20. Because drain plugs with common size and threads are found on a wide range of various makes and years of automobiles, only a small number of different adapter blocks need be fabricated in order to fit most American automobiles. The adapter plug is tightened into the oil sump until it is snugly seated with aperture 24 in a direction convenient to attachment of the remaining components. Thick washer 22 cooperates to prevent oil leakage from the oil pan and permits rotation to a desired position. Valve block 30 may then be threaded and tightened into the adapter block. Tightening should stop when channel 34 is directed vertically downward so that outlet 35 may be inserted therein for directing the stream of used oil downward. This, of course, directs the stream of oil toward one spot regardless of the quantity of oil in the oil pan. Valve 40 is easily threaded into the connector block, and cap 58 drawn tightly over the trumpet connector 50 so as to seal the system from oil, dust or water intrusion. The control handle apparatus is mounted at a convenient location in the automobile's engine compartment. Bracket 65 may be slid along the cable housing so as to be mounted at various distances from handle 60. After mounting the bracket, the handle is pushed toward the bracket until it is flush permitting a pin to be inserted through hole in the handle and one bracket securing the valve in closed position. Since the cable core is flexible, the handle may be rotated further after the valve is in a closed position. Turning the handle 60 a half turn or so after the valve is closed and securing the handle in that position with pin 64 biases the valve closed under spring tension. When it is desired to change oil, the retaining pin 64 is removed and the handle rotated until oil begins to flow steadily out of the discharge tube. When the oil has stopped flowing, the procedure above is reversed to close the valve. While the device has been used primarily as an oil drain, it may have other uses, such as draining radiator liquid, hydraulic fluid, etc.

The above disclosure discusses the use of the adaptor plug in connection with the attachment of the remote controlled valve. The remote controlled valve may, in some instances, be used without the adaptor plug where the unit is readily installed on the oil pan in a conveniently located opening which permits proper placement of the cable into a convenient location in the engine compartment. The size, shape and pitch of the threads of the end 32 may be made to threadedly attach to the oil plug opening in the pan. In some instances, the block 30 may have to be made larger to permit the use of the end 32 directly into the oil pan. However, the unit operates in the same manner whether used with or without the adaptor plug.

I claim:

1. A remotely controlled drain valve apparatus for fluids from reservoirs on automobiles including enging oil sumps, comprising a threaded adapter having a passageway formed therethrough for replacing the drain plugs for such reservoirs; relatively thick, compressible, resilient gasket means for sealing between said threaded adapter and such reservoir permitting limited rotation of said threaded adapter while maintaining the seal and thereby insuring proper alignment of said adapter; valve means having an inlet communicating with said passageway in said adapter and a selectively downwardly directed outlet, said valve means including threaded passageway therethrough, with a stepped portion including a valve seat, a threaded cylindrical valve threaded into said threaded portion, soft and wear resistant valve disc means attached to the leading end of said cylindrical valve for sealing against said valve seat in said passageway; flexible, elongated, wire wound cable means secured at one end to said cylindrical valve for rotating said cylindrical valve in an opening and closing actuating action and the opposite end thereof mounted in an easily accessible position remote from said valve; moisture proof sheath means completely enclosing said cable means inclusive of protector means fixed to one end of said sheath means adjacent said valve housing means and selectively sealable to said housing means so as to seal said valve from exterior dirt and moisture; a handle mounted on the opposite end of said cable means for rotating the same to thereby rotate said cylindrical valve in said opening and closing actuating action; and means for temporarily securing said handle in a predetermined position biasing said cable means against said cylindrical valve in closed position providing a positive sealing of said valve under operating conditions of the automobile on which it is mounted.

2. A remotely controlled drain valve apparatus according to claim 1, wherein said means for temporarily securing said handle includes an aperture through said handle and a pin passing through said aperture in contact with a stop preventing rotation of said handle.

References Cited

UNITED STATES PATENTS

| | | | |
|---|---|---|---|
| 3,537,679 | 11/1970 | McCarthy et al. | 251—144 |
| 2,646,246 | 7/1953 | Tucci | 251—357 |
| 3,137,476 | 6/1964 | Rotheraine et al. | 251—368 X |
| 2,368,457 | 1/1945 | Eisenbeis | 64—2 |
| 3,518,844 | 7/1970 | Robbins | 64—4 |
| 1,434,846 | 11/1922 | Schwiesow | 137—385 |
| 1,818,123 | 8/1931 | Engbrecht | 184—1.5 |
| 3,440,836 | 4/1969 | Petersen | 64—4 |
| 3,049,334 | 8/1962 | Montague | 251—144 X |

HENRY T. KLINKSIEK, Primary Examiner

U.S. Cl. X.R.

251—110